(12) United States Patent
Deshpande et al.

(10) Patent No.: US 9,026,742 B2
(45) Date of Patent: May 5, 2015

(54) SYSTEM AND METHOD FOR PROCESSING POTENTIALLY SELF-INCONSISTENT MEMORY TRANSACTIONS

(75) Inventors: Sanjay R. Deshpande, Austin, TX (US); Klas M. Bruce, Leander, TX (US); Michael D. Snyder, Cedar Park, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 965 days.

(21) Appl. No.: 11/962,331

(22) Filed: Dec. 21, 2007

(65) Prior Publication Data

US 2009/0164737 A1 Jun. 25, 2009

(51) Int. Cl.
*G06F 13/20* (2006.01)
*G06F 12/08* (2006.01)

(52) U.S. Cl.
CPC ........ *G06F 12/0828* (2013.01); *G06F 12/0831* (2013.01); *G06F 2212/1016* (2013.01); *G06F 2212/507* (2013.01)

(58) Field of Classification Search
CPC .................................................. G06F 12/0831
USPC .......................................... 711/141, 146, 165
See application file for complete search history.

(56) References Cited

U.S. PATENT DOCUMENTS

| | | | |
|---|---|---|---|
| 5,832,534 A | 11/1998 | Singh et al. | |
| 5,903,908 A | 5/1999 | Singh et al. | |
| 5,960,457 A | 9/1999 | Skrovan et al. | |
| 6,122,712 A | 9/2000 | Torii | |
| 6,304,945 B1 | 10/2001 | Koenen | |
| 6,519,685 B1 | 2/2003 | Chang | |
| 6,694,409 B2 | 2/2004 | Chang | |
| 7,334,089 B2 | 2/2008 | Glasco | |
| 7,366,847 B2 | 4/2008 | Kruckemyer et al. | |
| 2003/0097529 A1 | 5/2003 | Arimilli et al. | |
| 2003/0115423 A1 | 6/2003 | Chang | |
| 2003/0225980 A1 | 12/2003 | Henry et al. | |
| 2004/0076154 A1* | 4/2004 | Mizutani et al. | 370/389 |
| 2004/0111563 A1 | 6/2004 | Edirisooriya et al. | |
| 2004/0236912 A1* | 11/2004 | Glasco | 711/141 |
| 2005/0160226 A1 | 7/2005 | Averill et al. | |
| 2007/0186054 A1 | 8/2007 | Kruckemyer et al. | |

OTHER PUBLICATIONS

Actions on the Merits by the U.S.P.T.O. as of Mar. 3, 2009, ## pages.

* cited by examiner

*Primary Examiner* — Jae Yu

(57) ABSTRACT

A processor provides memory request and a coherency state value for a coherency granule associated with a memory request. The processor further provides either a first indicator or a second indicator depending on whether the coherency state value represents a cumulative coherency state for a plurality of caches of the processor. The first indicator and the second indicator identify the coherency state value as representing a cumulative coherency state or a potentially non-cumulative coherency state, respectively. If the second indicator is provided, a transaction management module determines whether to request the cumulative coherency state for the coherency granule in response to receiving the second indicator. The transaction management module then provides an indicator of the request for the cumulative coherency state to the processor in response to determining to request the cumulative coherency state. Otherwise, the transaction management module processes the memory transaction without requesting the cumulative coherency state.

20 Claims, 3 Drawing Sheets

SYSTEM AND METHOD FOR PROCESSING POTENTIALLY SELF-INCONSISTENT MEMORY TRANSACTIONS

FIELD OF THE DISCLOSURE

The present disclosure relates generally to multiple-processor systems and more particularly to cache coherency in multiple-processor systems.

BACKGROUND

Multiple-processor systems generally are configured so that many regions of a memory are shared by more than one processor. Typically, each processor utilizes one or more local caches to maintain copies of data accessed from shared memory. Due to the shared nature of the memory and its stored data, multiple-processor systems typically utilize a cache coherency protocol in an attempt to maintain all of the caches in a state of coherence so that a change to the local copy of a shared memory location can propagate to other processors as necessary. One conventional cache coherency technique includes the use of a coherency directory at each processing node that stores the cache state for each local memory location shared with other processing nodes. In response to processing a memory transaction for a memory location, each processor of the processing node reports compliance with the coherency requirements of the memory transaction. The coherency directory updates its coherency state information based on assumptions made from the reported compliance and routes subsequent memory transactions based on the cache state information for the memory locations associated with the memory transactions. However, these coherency compliance reports often are misleading or incomplete in conventional directory-based coherency systems as they fail to establish with any certainty the cumulative coherency state of the accessed memory location for the processor. Rather, these coherency compliance responses typically only acknowledge compliance with the coherency requirements associated with the memory transaction and may not represent the true coherency state in the cache hierarchy of the processor. Accordingly, it will be appreciated that a technique for enforcing the reporting of the true cache coherency state in a multiple-processor system would be advantageous.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Figure 1:
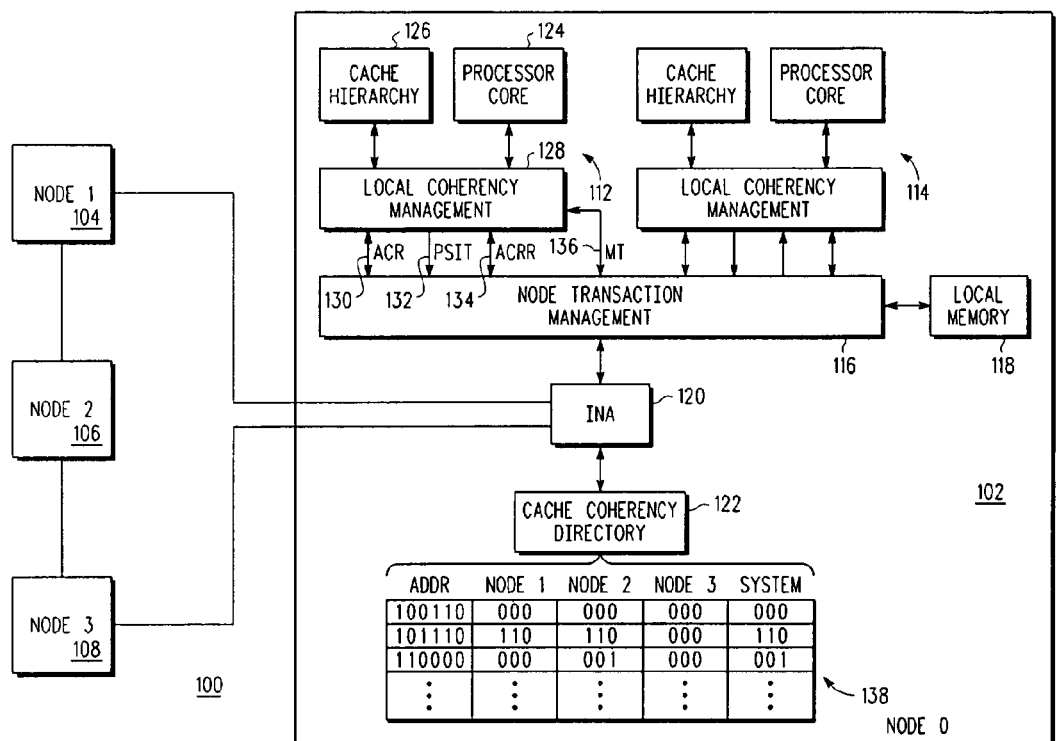
FIG. 1 is a block diagram illustrating a multiple-processor system in accordance with at least one embodiment of the present disclosure.
Figure 2:
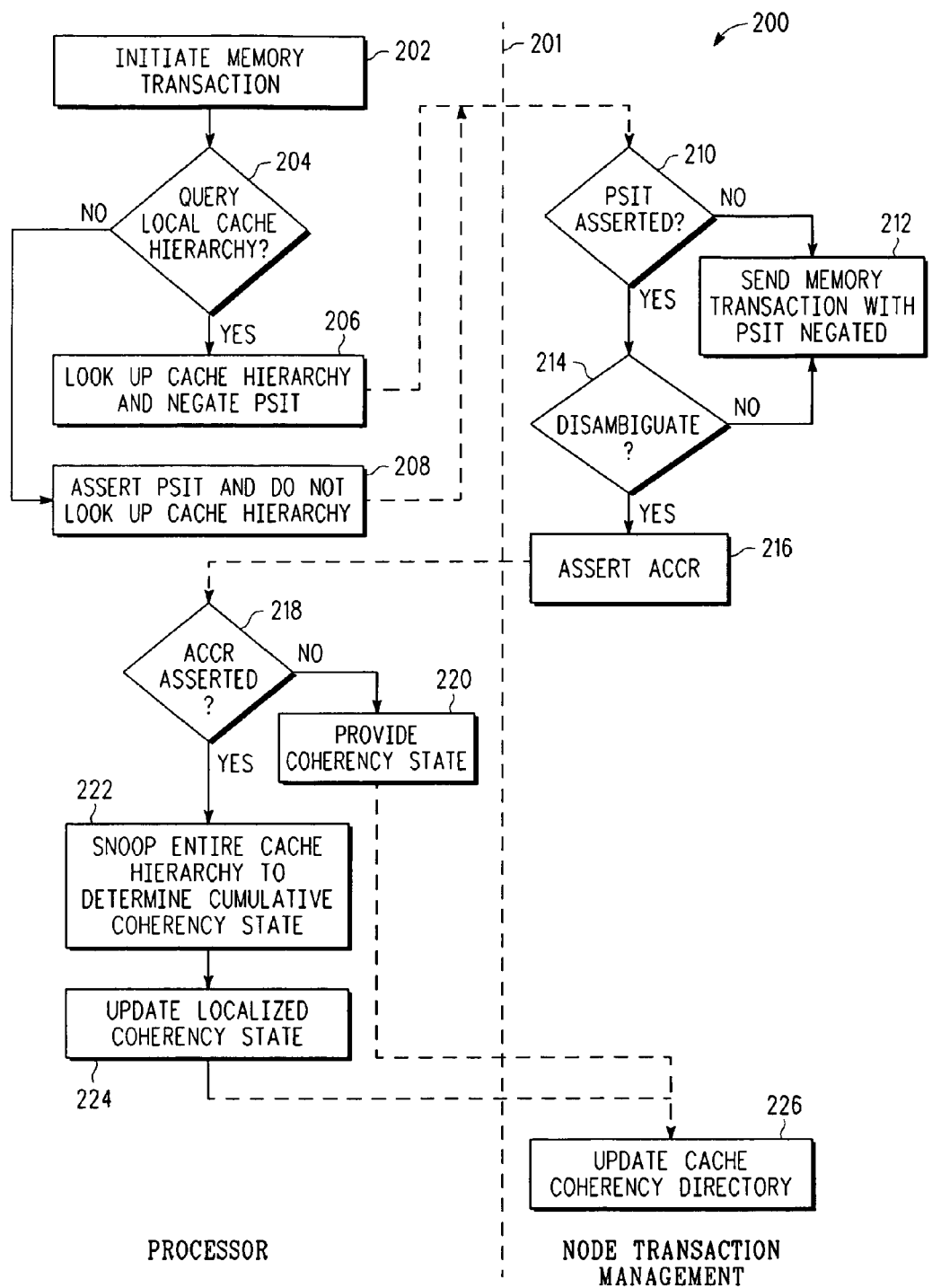
FIG. 2 is a flow diagram illustrating a method for processing memory requests in the multiple-processor system of FIG. 1 in accordance with at least one embodiment of the present disclosure.
Figure 3:
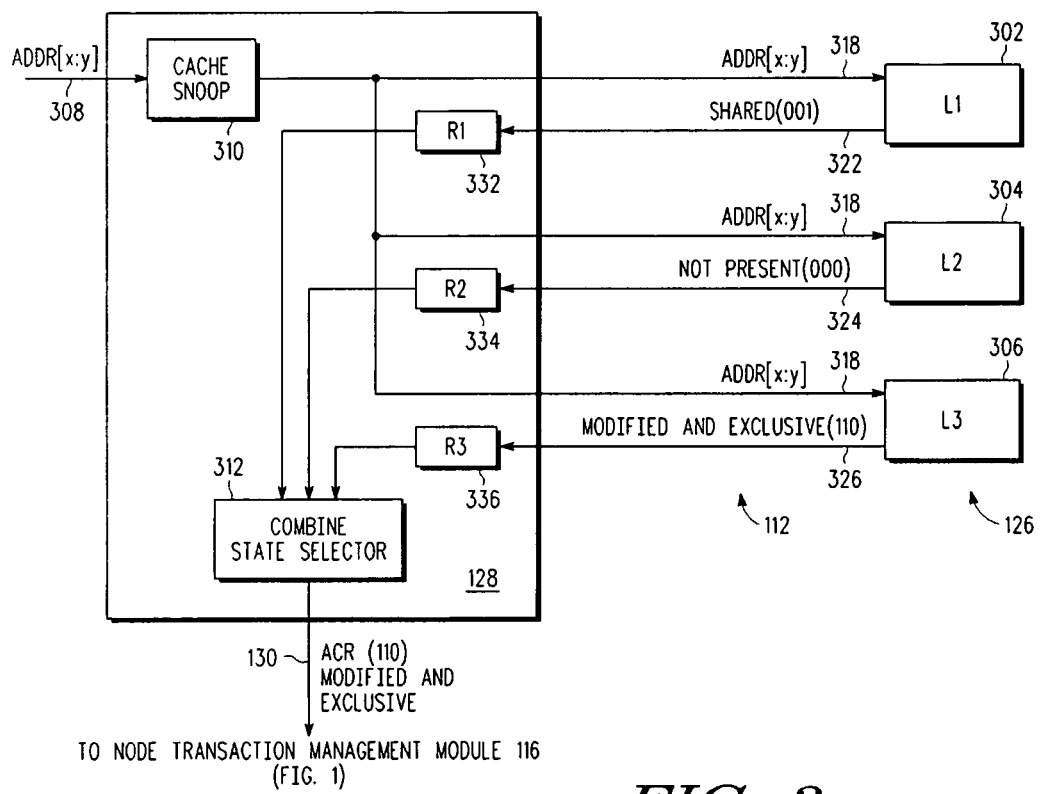
FIG. 3 is a block diagram illustrating a cache hierarchy and local coherency management module of a processor of the multiprocessor system of FIG. 1 in accordance with at least one embodiment of the present disclosure.

FIGS. 1-3 illustrate techniques for implementing cache coherency in a multi-processor system utilizing shared memory. In one embodiment, a processor of a multiple-processor system having shared memory generates a memory transaction in response to an operation performed at the processor, whereby the memory transaction is to act upon an identified memory location associated with a certain coherency granule. The processor further determines whether the memory transaction is a speculative transaction, i.e., a potentially self-inconsistent transaction (PSIT), in that the processor, in processing the transaction, may not have verified the coherency status of the identified memory location throughout its entire cache hierarchy before issuing the transaction. The processor then provides the memory transaction and a PSIT indicator to a transaction management module coupled to each of the processors. In response to the PSIT indicator having asserted state (thereby indicating that the transaction is speculative), the transaction management module determines to disambiguate the PSIT by requesting a cumulative coherency state of the identified memory location from the processor. If a cumulative coherency state is to be requested, when the transaction management module returns the memory transaction back to the processor for self-snooping at the processor, it places a "cumulative response required (ACCR)" indicator in an asserted state. In response to the assertion of the ACCR indicator, the processor snoops its entire cache hierarchy to unambiguously determine the cumulative coherency state of the identified memory location and then reports the cumulative coherency state to the transaction management module, which then may initiate processing of the memory transaction. In the event that the transaction management module determines that the speculative coherency state is acceptable, the transaction management module maintains the ACCR indicator in an unasserted state, thereby indicating to the processor that no additional cache snooping is required. Thus, by requesting disambiguation of a speculative memory transaction only in certain instances, a processor can reduce the amount of cache snooping performed during its memory transactions for those speculative memory transactions that are accepted for processing, thereby improving processor performance.

A coherency granule is identified as a unit of data for which cache coherency is individually maintained. A coherency granule typically is associated with a corresponding range of memory addresses. For purposes of illustration, it is assumed herein that a coherency granule and a cache line are of equal amounts of data, such as, for example, 32 bytes, 64 bytes, 128 bytes, etc. In other implementations, a coherency granule can represent the state of more than one cache line, or the state of only a portion of a cache line.

A cumulative coherency state is identified as a coherency state that represents the overall coherency state for a corresponding coherency granule for the entire cache hierarchy of a processor. A non-cumulative coherency state is identified as a coherency state for a corresponding granule that may be inconsistent with the cumulative coherency state of the coherency granule. A potentially non-cumulative coherency state is identified as a coherency state for a corresponding granule for only a subset of the cache hierarchy of a processor, and may or may not be consistent with the cumulative coherency state of the coherency granule for the entire cache hierarchy. A potentially self-inconsistent memory transaction (PSIT) is identified as a memory transaction generated by a processor that is potentially inconsistent with the cumulative state of the cache hierarchy associated with the processor. As such, a PSIT implies a certain cumulative coherency state for a coherency granule in the cache hierarchy from which it is generated, but is speculative in that it may not be the actual cumulative coherency state of the coherency granule for the cache hierarchy of the processor.

FIG. 1 illustrates a multiple-processor system 100 in accordance with at least one embodiment of the present disclosure. The multiple-processor system 100 includes a plurality of processing nodes 102, 104, 106, and 108 (hereinafter, processing nodes 102-108). As illustrated by processing node 102, some or all of the processing nodes 102-108 each includes a plurality of processors (e.g., processors 112 and 114), a node transaction management module 116, a local memory 118, an inter-node agent (INA) 120, and a cache coherency directory 122.

The processors 112 and 114 each include a processor core 124, a cache hierarchy 126 and a local coherency management module 128. The processor core 124 includes one or more instruction execution pipelines to receive and execute instructions represented by instruction data and operand data retrieved from a shared memory (e.g., local memory 118) and stored in the cache hierarchy 126. The cache hierarchy 126 includes a plurality of local caches, such as, for example, L1 caches for instructions and data, L2 caches for instructions and data, and the like. The local coherency management module 128 is coupled to the caches of the cache hierarchy 126. The local coherency management module 128 further is coupled to the node transaction management module 116 via a port carrying signaling, including an address coherency response (ACR) signal 130, a potentially self-inconsistent transaction (PSIT) signal 132, a cumulative response required (ACRR) signal 134, and a memory transaction (MT) signal 136 (hereinafter, "the signals 130-136"). Although an embodiment wherein the signals 130-136 each is a separate single-bit or multi-bit signal is described herein for illustrative purposes, it will be appreciated that in other embodiments the information represented by two or more of the signals 130-136 can be provided together as a single signal.

The MT signal 136, in one embodiment, is used by the corresponding processor to provide a memory transaction to the node transaction management module 116 for processing and distribution. Further, in one embodiment, the node transaction management module 116 utilizes the MT signal 136 to feedback a submitted memory transaction during a coherency disambiguation process, as described herein. The ACR signal 130 is used to provide an indicator representative of a compliance with a coherency requirement of a memory transaction being processed by processor 112. To illustrate, assume that the processor 112 receives a flush transaction intended to flush a cache line from each processor of the multiple-processor system 100. In this case, the coherency requirement of the flush transaction would be that the cache line is flushed from the processor 112. Accordingly, in response to processing a memory transaction, the processor 112 provides an indicator representing that the processor 112 has complied, with the coherency requirement of the memory transaction as the ACR signal 130.

In certain instances the coherency state represented by a value of the ACR signal 130 is a speculative coherency state of the corresponding processor in that the processor did not verify that the supplied coherency state represents the cumulative coherency state of the entirety of the cache hierarchy 126. Instances in which the coherency state represented by the ACR signal 130 may be speculative can include, for example, a Read transaction issued by a prefetch engine inside a processor for which the processor decides to skip interrogation of the cache hierarchy to report the cumulative state. In other instances the coherency state represented by the ACR signal 130 is an unambiguous, or cumulative, coherency state in that the processor has verified that the provided coherency state represents the cumulative coherency state of the entirety of the cache hierarchy 126. Table 1 illustrates example indicators of coherency compliance that can be provided as the ACR signal 130.

TABLE 1

| ACR(0:3) | Response | Mnemonic | Semantics |
| --- | --- | --- | --- |
| 0000 | Transaction Error | T-Error | Transaction error. The error indicates a malformed transaction. The error could be: invalid type, unrecognized address by the system, invalid qualifiers, etc. |
| 0001 | Shared | S | The coherency granule is resident in this cache. Residence implies either a copy of the data belonging to the granule, or Reservation associated with the granule's address, or both. |
| 0010 | Modified Intervention | M-Int | This cache currently has a copy of the coherency granule that is modified with respect to memory (and therefore more recent). At most one cache hierarchy in the system my respond in this manner for any given transaction. |
| 0011 | Shared Intervention or Exclusive Intervention | S-Int or E-Int | This cache was the last to receive a copy of the coherency granule or has the coherency granule in an Exclusive state and therefore will provide a copy of the granule in response to the command. At most one cache hierarchy in the system may respond in this manner for any given transaction. |
| 0100 | Reserved | | |
| 0101 | Reserved | | |
| 0110 | Proxy Intervention | P-Int | A proxy device currently owns a modified copy of the coherency granule and therefore will provide a copy of the granule in response to the command. At most one cache hierarchy in the system may respond in this manner for any given reason. |

TABLE 1-continued

| ACR(0:3) | Response | Mnemonic | Semantics |
|---|---|---|---|
| 0111 | Null | Null | Default response by a device seeing the transaction. No other response is applicable. |
| 1000 | Reserved | | |
| 1010 | Modified Cast-Out | M-COut | This cache hierarchy is casting out a copy of the coherency granule that is modified with respect to memory (and therefore more recent). At most one cache hierarchy in the system may respond in this manner for any given transaction. |
| 1011-1111 | Reserved | | |

The PSIT signal 132, in one embodiment, is utilized by the corresponding processor to indicate whether a memory transaction issued by the processor (e.g., via MT signal 136) is a PSIT. In one embodiment, the PSIT signal 132 includes a one bit signal, whereby an asserted state of the PSIT signal 132 (e.g., a bit value of "1") indicates that the processor has identified the memory transaction as a PSIT and an unasserted state of the PSIT signal 132 (e.g., a bit value of "0") indicates that the processor has identified the memory transaction as a non-PSIT, or a fully consistent transaction.

The ACRR signal 134, in one embodiment, is utilized by the node transaction management module 116 to request that the corresponding processor disambiguate a submitted PSIT by, for example, snooping its entire cache hierarchy to identify the cumulative coherency state for the coherency granule associated with the PSIT. In one embodiment, the ACRR signal 134 includes a one bit signal, whereby an asserted state of the ACRR signal 134 (e.g., a bit value of "1") indicates that the node transaction management module 116 has requested disambiguation of a coherency state for the PSIT and an unasserted state of the ACRR signal 134 (e.g., a bit value of "0") indicates the node transaction management module 116 has not requested disambiguation of the coherency state.

The inter-node agent 120 is coupled to the node transaction management module 116 and the cache coherency directory 122 of the processing node 102, and further is coupled to the inter-node agents of one or more of the other processing nodes 104, 106, and 108. In one embodiment, the inter-node agent 120 is configured to transfer coherency indicators from the local coherency management modules 128 of the processing node 102 to the cache coherency directory 122 to facilitate updating of one or more coherency tables 138 of the cache coherency directory 122, and further to facilitate access to the coherency tables 138 of the cache coherency directory 122 by the local coherency management module 128. Additionally, the inter-node agent 120 is configured to provide coherency indicators from the local coherency management modules 128 of the processing node 102 to the inter-node agents of the other processing nodes so that the other processing nodes can update their cache coherency directories. Likewise, the inter-node agent 120 is configured to receive coherency indicators from other processing nodes and transferring the received coherency indicators to the cache coherency directory 122 to facilitate updating the one or more coherency tables 138 based on the coherency information from other processing nodes represented by the received indicators. Further, the inter-node agent 120 is configured to transfer memory transactions between processing nodes. In the illustrated example, the processing nodes 102-108 are coupled in a ring-type network arrangement. However, the processing nodes 102-108 can be coupled in other network arrangements, such as a hub-and-spoke arrangement, without departing from the scope of the present disclosure.

The cache coherency directory 122 is coupled to the inter-node agent 120 and includes one or more coherency tables 138 to store coherency state information for some or all coherency granules of local memory (or memories) that have been borrowed by another processing node. In one embodiment, the cache coherency directory 122 includes a plurality of the coherency tables 138, whereby each table is indexed based on a lower portion of a memory address associated with a memory transaction received at the node transaction management module 116. Accordingly, each coherency table 138 includes a plurality of entries, each entry including an index field based on an upper portion of a memory address corresponding to a coherency granule and a field representing a coherency state for the coherency granule for the other processing nodes. In the example of FIG. 1, the coherency table 138 includes a field representing a coherency state for the coherency granule for the processing node 104 ("Node 1"), a field representing a coherency state for the coherency granule for the processing node 106 ("Node 2"), a field representing a coherency state for the coherency granule for the processing node 108 ("Node 3"). In one embodiment, the coherency table 138 further can include a field representing a system coherency state for the coherency granule. The system coherency state, in one embodiment, is selected as the most restrictive coherency state of the processing node-specific coherency states for the coherency granule.

FIG. 2 illustrates an exemplary method 200 of operation for the processor 112 of the processing node 102 in the multiprocessor system 100 of FIG. 1 in accordance with at least one embodiment of the present disclosure. The other processors (e.g., processor 114) and other processing nodes (e.g., processing nodes 104-108) can operate in a similar manner. In the depicted example, those processes represented by blocks to the left of the vertical line 201 are performed by the processor 112, while those processes represented by blocks to the right of the vertical line 201 are performed by the node transaction management module 116. The dashed lines between blocks represent a change of the flow between the processor 112 to the node transaction management module 116.

At block 202, the processor 112 initiates a memory transaction in response to the prefetching or execution of instructions. As each memory transaction is generated, the local coherency management module 128 of the processor 112 determines whether to query the local cache hierarchy to determine whether the transaction is in fact necessary at block 204. In certain instances, the decision might be to not query the cache hierarchy 126, and to this extent, the transaction is speculative and therefore potentially self-inconsistent with the localized cumulative coherency state. To illustrate, assume that the processor 112 is configured to not snoop any cache for prefetch operations. Accordingly, in the event that a prefetch results in a read transaction representing a cache miss or a "not present" state, it might be decide to not query the cache hierarchy 126 even though the data may in fact be in the cache hierarchy 126. In other instances, the memory transaction is non-speculative or unambiguous in that the processor 112 verifies that it is consistent with the cumulative coherency state of the entire cache hierarchy 126. Further, in some implementations, certain transactions, such as an instruction fetch that looks up only the L1 instruction cache, are predetermined as PSIT transactions and the architecture of the processor 112 is configured to automatically recognize these predetermined transactions as PSIT transactions. Alternately, logic of the processor 112 can determine whether each cache in the cache hierarchy 126 has been snooped for a given memory transaction, and if not, can identify the memory transaction as a PSIT transaction.

As one example of a PSIT, an instruction fetch operation by a processor may result in a cache miss to a level 1 (L1) instruction cache of the processor. However, the processor may not be configured to access its L1 data cache in the event of cache misses to the L1 instruction cache. Accordingly, if the processor issues a read request in response to the cache miss to the L1 instruction cache without first checking the L1 data cache, the read request is a PSIT as the L1 data cache or some other cache in the cache hierarchy for the processor may in fact contain the coherency granule missing from the L1 instruction cache. Thus, if another cache of the cache hierarchy does in fact contain the coherency granule, the issuance of the read request incorrectly indicates that the coherency granule is not in the cache hierarchy of the processor.

As another example of a PSIT, assume a prefetch operation results in a cache miss to an L2 cache and the processor is not configured to checking whether an L1 cache has the referenced coherency granule. As it is possible that the coherency granule exits in an L1 cache in a modified state, the data provided in response to a read request generated based on the L2 cache miss consequently would be stale. This read request therefore is a PSIT.

As yet another example of a PSIT, assume that a cast-out of a modified line of a unified L2 cache causes a write with cast-out (WCO) request to be provided to the system transaction management module 106. Further assume that before the WCO request is issue, the L1 data cache is not checked to see whether it has a copy of the coherency granule. In the event that the L1 data cache has a more recently modified copy than was present in the unified L2 cache, the WCO is an actual self-inconsistent transaction (SIT) because it incorrectly implies to the system transaction management module 106, and therefore to the coherency directory 108, that the cache hierarchy 126 is getting rid of its copy of the coherency granule.

In the event that the processor 112 determines to query the cache hierarchy 126, at block 206 the processor 112 looks up the cache hierarchy 126 to determine the cumulative coherency state of the coherency granule associated with the memory transaction, provides the memory transaction to the node transaction management module 116 along with the cumulative coherency state, and the local coherency management module 128 negates the PSIT signal 132 if asserted or otherwise maintains the PSIT signal 132 in an unasserted state. Further, the processor 112 also provides a representation of the memory transaction via MT signal 136 to the node transaction management module 116 for processing and distribution at block 206. Otherwise, in the event that the processor 112 determines to not query the local cache hierarchy, the processor 112 provides the memory transaction to the node transaction management module 116 along with a speculative coherency state of the coherency granule and the local coherency management module 128 asserts the PSIT signal 132, if not already asserted, to identify the memory transaction as a PSIT at block 208. Further, the processor 112 also provides a representation of the memory transaction via MT signal 136 to the node transaction management module 116 for processing and distribution at block 208.

In response to receiving the memory transaction (as provided by the processor 112 at either block 206 or block 208), at block 210 the node transaction management module 116 determines whether the PSIT signal 132 is asserted. If unasserted (or negated), at block 212 the node transaction management module 116 provides the memory transaction to the other processors and processing nodes for processing with the PSIT signal 132. Further, in response to determining that the PSIT signal 132 is unasserted, any coherency state updates received from the processor 112 or another processor/processing node for the coherency granule in response to processing the memory transaction can be used to update the coherency tables 138 by, for example, replacing the values representative of an old coherency state of the coherency granule for a processing node with a different value representative of the current coherency state of the coherency granule for the processing node, as well as by updating the system coherency state to reflect the current coherency state of the coherency granule in the event that the current coherency state for the processing node is the most restrictive current coherency state of all of the processing nodes of the multiple-processor system 100.

Otherwise, if the PSIT signal 132 is asserted, thereby indicating the coherency state provided by the processor 112 is speculative, at block 214 the node transaction management module 116 determines whether disambiguation of the speculative coherency state is desired based on any of a variety of factors. For example, because it typically is more efficient for one processor to snoop the cache hierarchies 126 of processors in the same node than it is to snoop the cache hierarchies 126 of processors in remote nodes, local memory transactions that are PSITs may not need disambiguation, whereas inter-node memory transactions that are PSITs may require disambiguation to avoid the overhead and inefficiencies involved with remote cache snooping.

In the event that disambiguation is not identified as needed, the node transaction management module 116 places or maintains the ACRR signal 134 in an unasserted state (thereby indicating that no disambiguation is requested) and processes the memory transaction at block 212 in the manner described above. In the event that disambiguation is identified as needed, the node transaction management module 116 asserts the ACCR signal 134 at block 216.

At block 218, the local coherency management module 128 determines whether the ACCR signal 134 is asserted. If not asserted, at block 220 the processor 112 can provide the potentially non-cumulative coherency state without cache lookup at block 220, whereupon the cache coherency directory can be updated using the coherency state as described below with reference to block 226. Otherwise, if the ACCR signal 134 is asserted, at block 222 the local coherency management module 128 disambiguates the potentially non-cumulative coherency state of the coherency granule by, for example, snooping the entire cache hierarchy 126 to determine the cumulative coherency state for the coherency granule based on the plurality of cache-specific coherency states at block 220. Note that, in one embodiment, the non-originating processors can be configured to always look up their entire cache hierarchies for producing a coherency response for a snooped transaction. As discussed in greater detail herein with reference to FIG. 3, the local coherency management module 128 can determine the coherency state for the entire cache hierarchy 126 by selecting the most restrictive cache-specific coherency state of the cache hierarchy 126. Other techniques for verifying the cumulative coherency state of a coherency granule in a cache hierarchy may be used without departing from the scope of the present disclosure.

At block 224, the local coherency management module 128 provides a coherency state value representative of the cumulative coherency state identified at block 222 as the localized coherency state of the memory location associated with the memory transaction via the ACR signal 130. In response to receiving coherency state via the ACR signal 130, the home node transaction management module decides wither to assert the ACRR signal 134 in a process similar to the process of block 116 and processes updated localized coherency state at block 226 by updating the cache tables 138 of the cache coherency directory 122 as described above.

FIG. 3 illustrates an implementation of a portion of the a processor (e.g., processor 112) of the multiple-processor system 100 (FIG. 1) with respect to the determination of a coherency state of a coherency granule for the entire cache hierarchy 126 in accordance with at least one embodiment of the present disclosure. As illustrated, the cache hierarchy 126 includes a plurality of caches, such as, for example, a L1 unified (e.g., data and instruction) cache 302, a L2 unified cache 304, and a L3 unified cache 306 (hereinafter, caches 302-306). The local coherency management module 128 includes a cache snoop module 310, a combined state selector 312, a register 332, a register 334, and a register 336. The cache snoop module 310 includes an input to receive a memory address portion 308 (ADDR[x:y]) associated with a memory transaction received by the processor 112. The cache snoop module 310 further includes an output to provide the memory address portion 308 to each of the L1 unified cache 302, the L2 unified cache 304, and the L3 unified cache 306 in response to receiving the memory address portion 308. The combined state selector 312 includes an input coupled to each of the register 332, the register 334, and the register 336, and an output to provide the ACR signal 130.

After receiving the memory address portion 308, the cache snoop module 310 snoops each of the caches 302-306 to determine the cache-specific coherency state for each cache. As part of the snoop of a cache, the cache snoop module 310 provides the memory address portion 308 as address signal 318 to each of the caches 302-306. Each of the caches 302-306 responds to the address signal 318 with the coherency state of the coherency granule within the cache. In FIG. 3, the coherency state for the L1 unified cache 302 is stored in the register 332, the coherency state for the L2 unified cache 304 is stored in the register 334, and the coherency state for the L3 unified cache 306 is stored in the register 336. The combined state selector 312, in one embodiment, accesses the cache-specific coherency states stored in the register 332, the register 334 and the register 336 and selects one to represent the cumulative coherency state of the associated coherency granule for the cache hierarchy 126 and thus the cumulative coherency state of the associated coherency granule for the processor 112.

In at least one embodiment, the combined state selector 312 selects the most restrictive cache-specific coherency state of the caches 302-306 as the cumulative coherency state. To illustrate, in one embodiment, the ACR signal 130 is used to provide an indicator represented as a set of bits, where a first subset of the set of bits represents a reservation state of the coherency granule held by the cache hierarchy 126 and a second subset of the set of bits represents the shared state and the modified state of the coherency granule held by the cache hierarchy 126. For example, the indicator provided as the ACR signal 130 can be represented as a four-bit signal, ACR [0:4], where ACR[0]=1 indicates that a reservation is held by the cache hierarchy 126 for the coherency granule and ACR [0]=0 indicates that no reservation is held by the cache hierarchy 126. Further, the bits ACR[1:3] can be coded according to Table 2, listed below, or another table.

TABLE 2

| ACR [1:3] | Coherency State |
|---|---|
| 000 | Coherency granule not present |
| 001 | Coherency granule is being held in the Shared state |
| 010 | Coherency granule being held in the Shared/Shared with Last Reader (SL) state or the Exclusive state; currently unresolved |
| 011 | Coherency granule is being held in the Exclusive state |
| 100 | Reserved |
| 101 | Reserved |
| 110 | Coherency granule being held in Modified and Exclusive state |
| 111 | Reserved |

As illustrated by Table 2, the bit codings for the coherency state can be configured so as to increase in value as the relative restrictiveness of the coherency state increases such that the least restrictive coherency state (coherency granule not present) is coded as value "000" whereas the most restrictive coherency state, coherency granule held in Modified and Exclusive state, is coded as value "110". Accordingly, in such instances, the combined state selector 312 can select the most restrictive state of the cache-specific coherency states as the coherency state for the entire cache hierarchy 126 by selecting the maximum coding value of the cache-specific states. To illustrate by way of the example of FIG. 3, assume that the cache-specific coherency state for the L1 unified cache 302 is the Shared state (i.e., coding "001"), the cache-specific coherency state for the L2 unified cache 304 is the Not Present state (i.e., coding "000"), and the cache-specific coherency state for the L3 unified cache 306 is the Modified and Exclusive state (i.e., coding "110"). In this example, the combined state selector 312 would output a coding of "110" for ACR [1:3] to reflect the most restrictive coherency state, i.e., Modified and Exclusive state, for the coherency granule in all of the caches 302-306 of the cache hierarchy 126.

In this document, relational terms such as "first" and "second", and the like, may be used solely to distinguish one entity or action from another entity or action without necessarily requiring or implying any actual such relationship or order between such entities or actions. The terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The terms "assert" or "set" and "negate" (or "deassert" or "clear") are used when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A method comprising:
providing, from a processor, a memory request and a first coherency state value for a coherency granule associated with the memory request;
providing, from the processor, a select one of a first indicator or a second indicator in response to determining whether the first coherency state value represents a combined coherency state for a plurality of caches of the processor, the first indicator identifying the first coherency state value as representing a cumulative coherency state and the second indicator identifying the first coherency state value as representing a potentially non-cumulative coherency state;
receiving, at the processor, a request for the combined coherency state for the coherency granule in response to providing the second indicator;
determining a second coherency state value for the coherency granule in response to the request, the second coherency state value representing the combined coherency state for the coherency granule for the processor:
providing the second coherency state value and the first indicator in response to determining the second coherency state value;
wherein determining the second coherency state value further comprises;
snooping each cache of the plurality of caches to determine a plurality of cache coherency states values, each cache coherency state value representing a coherency state of the coherency granule of a corresponding cache; and
selecting the second coherency state value from the plurality of cache coherency state values.

2. The method of claim 1, wherein selecting the second coherency state value from the plurality of cache coherency state values comprises selecting as the second coherency state value a cache coherency state value representing a most restrictive cache coherency state of the coherency states represented by the cache coherency state values.

3. The method of claim 2, wherein each the cache coherency state values comprises a distinct value corresponding to a relative restrictiveness of the corresponding coherency state.

4. The method of claim 1, further comprising:
determining whether to request the combined coherency state for the coherency granule in response to receiving the second indicator from the processor; and
providing an indicator of the request for the combined coherency state to the processor in response to determining to request the combined coherency state.

5. The method of claim 4, further comprising:
processing the memory transaction without requesting the combined coherency state in response to determining not to request the combined coherency state.

6. The method of claim 1, further comprising:
providing the memory request and the first coherency state value for the coherency granule to another processor in response to providing the first indicator.

7. The method of claim 1, further comprising:
determining whether to request the particular coherency state for the first coherency granule from the processor in response to receiving the first indicator.

8. The method of claim 7, wherein the request for the particular coherency state for the coherency granule is in response to determining to request the particular coherency state.

9. The method of claim 7, further comprising:
providing the memory request and the first coherency state value for the coherency granule to another processor in response to determining not to request the particular coherency state.

10. The method of claim 1, further comprising:
updating a cache coherency directory in response to providing the second coherency state value and the first indicator.

11. The method of claim 1, wherein the cache coherency directory comprises an entry for the cache coherency granule and a plurality of processor node coherency state values.

12. The method of claim 1, wherein the first coherency state value indicates one of a transaction error state, a shared state, a modified intervention state, a shared intervention state, a proxy intervention state, a null state, and a modified cast-out state.

13. A method comprising:
receiving, from a processor, a first memory request and a first coherency state value for a first coherency granule associated with the first memory request;
receiving, from the processor, a first indicator associated with the first coherency state value, the first indicator identifying the first coherency state value as representing a potentially non-cumulative coherency state of the first coherency granule for a plurality of caches of the processor;
determining whether to request a combined coherency state for the first coherency granule from the processor in response to receiving the first indicator;
providing a second indicator to the processor to request the combined coherency state for the first coherency granule in response to determining to request the combined coherency state for the first coherency granule;
receiving, from the processor, a second memory request and a second coherency state value for a second coherency granule associated with the second memory request;
receiving, from the processor, a second indicator associated with the second coherency state value, the second indicator identifying the second coherency state value as representing a cumulative coherency state of the second coherency granule for the plurality of caches of the processor; and
processing the second memory request for distribution in response to receiving the second indicator.

14. The method of claim 13, further comprising:
receiving, from the processor, a third coherency state value for the first coherency granule and a third indicator associated with the second coherency state value subsequent to providing the second indicator, the third indicator identifying the third coherency state value as representing the cumulative coherency state of the first coherency granule; and
processing the first memory transaction for distribution in response to receiving the third coherency state value and the third indicator.

15. The method of claim 14, wherein processing the first memory transaction for distribution comprises updating a cache coherency directory based on the third coherency state value.

16. The method of claim 13, further comprising:
processing the first memory request for distribution in response to determining not to request the combined coherency state for the first coherency granule.

17. The method of claim 16, further comprising:

providing a third indicator to the processor in response to determining not to request the combined coherency state for the first coherency granule, the third indicator indicating the combined coherency state for the first coherency granule is not to be requested from the processor.

18. A system comprising:

a transaction management module associated with a plurality of processors; and a first processor of the plurality of processors, the first processor being coupleable to the transaction management module, the first processor comprising:

a processor core;

a plurality of caches; and a coherency management module comprising:

a first output configured to provide a memory transaction associated with a coherency granule;

a second output configured to provide a first coherency state value for the coherency granule; and a third output configured to provide a first indicator, the first indicator indicating whether first coherency state value represents a potentially non-cumulative coherency state for the coherency granule for the plurality of caches wherein the transaction management module comprises:

a first input coupled to the first output of the coherency management module to receive the memory transaction;

a second input coupled to the second output of the coherency management module to receive the first coherency state value;

a third input coupled to the third output of the coherency management module to receive the first indicator; and a first output; and wherein the transaction management module is configured to:

determine whether to request a combined coherency state of the coherency granule from the first processor in response to the first indicator; and provide a second indicator via the first output in response to determining to request the combined coherency state of the coherency granule from the processor, the second indicator representing a request for the combined coherency state of the coherency granule.

19. The system of claim 18, wherein:

the first processor further comprises a first input coupled to the first output of the transaction management module; and the first processor configured to:

determine a second coherency state value, the second coherency state value representing a cumulative coherency state of the coherency granule for the plurality of caches;

provide the second coherency state value via the second output of the coherency management module and a third indicator via the third output, the third indicator indicating that the second coherency state represents the cumulative coherency state of the coherency granule.

20. The system of claim 18, further comprising:

a second processor coupled to the transaction management module, the second processor having a shared memory with the first processor.

* * * * *